(12) United States Patent
Hori et al.

(10) Patent No.: US 7,871,316 B2
(45) Date of Patent: Jan. 18, 2011

(54) PASSAGE OPENING AND CLOSING DEVICE

(75) Inventors: Ryouji Hori, Obu (JP); Hiroyuki Satoh, Obu (JP); Masakazu Chihiro, Okazaki (JP)

(73) Assignee: DENSO Corporation, Kariya (JP)

( * ) Notice: Subject to any disclaimer, the term of this patent is extended or adjusted under 35 U.S.C. 154(b) by 897 days.

(21) Appl. No.: 11/810,129

(22) Filed: Jun. 4, 2007

(65) Prior Publication Data

US 2007/0293135 A1    Dec. 20, 2007

(30) Foreign Application Priority Data

Jun. 5, 2006    (JP) .............................. 2006-155730

(51) Int. Cl.
   *B24D 13/04*    (2006.01)
   *B60H 1/26*    (2006.01)
   *B60H 1/00*    (2006.01)

(52) U.S. Cl. .................... 454/69; 454/143; 454/121

(58) Field of Classification Search .................. 454/121, 454/69, 43, 143
   See application file for complete search history.

(56) References Cited

U.S. PATENT DOCUMENTS

| | | | | |
|---|---|---|---|---|
| 4,402,486 | A * | 9/1983 | Jacquet ........................ | 251/306 |
| 5,564,979 | A * | 10/1996 | Sumiya et al. .............. | 454/121 |
| 5,720,657 | A * | 2/1998 | Kamiya et al. .............. | 454/121 |
| 5,921,527 | A * | 7/1999 | Ikawa et al. ............. | 251/129.03 |
| 6,019,163 | A * | 2/2000 | Saida et al. .................... | 165/42 |
| 6,047,951 | A * | 4/2000 | Ito et al. ...................... | 251/308 |
| 6,419,206 | B1 * | 7/2002 | Wakamatu et al. .......... | 251/308 |
| 6,804,861 | B2 * | 10/2004 | Hsu ............................. | 16/366 |
| 7,340,800 | B2 * | 3/2008 | Gulley ........................ | 16/273 |
| 2002/0024037 | A1 | 2/2002 | Wakamatu et al. | |
| 2006/0252363 | A1 * | 11/2006 | Charlebois et al. .......... | 454/188 |
| 2007/0259614 | A1 * | 11/2007 | Barnhart et al. ............. | 454/121 |

FOREIGN PATENT DOCUMENTS

DE    10140904    5/2002

(Continued)

OTHER PUBLICATIONS

Office action dated Jun. 22, 2010 in corresponding German Application No. 10 2007 026620.2.

*Primary Examiner*—Kenneth B Rinehart
*Assistant Examiner*—Frances Kamps
(74) *Attorney, Agent, or Firm*—Harness, Dickey & Pierce, PLC (57) ABSTRACT

A passage opening and closing device has first and second doors for respectively opening and closing passages defined in a case. The first and second doors have first and second rotation shafts, respectively. Each of the first and second rotation shafts includes a projection on its first end and a cylindrical portion defining an engaging hole on its second end. When the first and second doors are assembled in a first assembled condition where the projections extend in opposite directions and the cylindrical portions are rotatably engaged with a second supporting portion of a shaft receiving portion, the first and second rotation shafts are independently rotatable. When the first and second doors are assembled in a second assembled condition where the projection of the second rotation shaft is engaged with the engaging hole of the first rotation shaft, relative rotation of the first and second rotation shafts is restricted.

10 Claims, 9 Drawing Sheets

FOREIGN PATENT DOCUMENTS

| | | |
|---|---|---|
| EP | 0 644 073 | 3/1995 |
| EP | 0925969 | 2/2006 |
| JP | 11-048746 | 2/1999 |
| JP | 11048746 * | 2/1999 |
| KR | 867697 * | 7/2007 |

* cited by examiner

PASSAGE OPENING AND CLOSING DEVICE

CROSS REFERENCE TO RELATED APPLICATION

This application is based on Japanese Patent Application No. 2006-155730 filed on Jun. 5, 2006, the disclosure of which is incorporated herein by reference.

FIELD OF THE INVENTION

The present invention relates to a passage opening and closing device, which is for example used to a vehicle air conditioning apparatus defining plural air passages.

BACKGROUND OF THE INVENTION

In an independently control-type air conditioning apparatus for independently controlling the air temperatures of left and right areas of a passenger compartment of a vehicle, a space inside of an air conditioning case is generally separated into two air passage spaces, and air mixing doors are respectively provided in the two air passage spaces. The air mixing doors are independently operated such that the temperatures of air in the two air passage spaces are separately controlled. As such, the temperatures of air to be blown toward the left and right areas of the passenger compartment are differentiated.

In fact, to improve efficiency of designing and manufacturing air conditioning apparatuses, it is preferable to share component parts between the independently control-type air conditioning apparatus and a general control-type air conditioning apparatus that does not independently control the air temperatures of the left and right areas. For example, Japanese Unexamined Patent Publication No. 11-48746 discloses air mixing doors that can be used in both of the independently control-type air conditioning apparatus and the general control-type air conditioning apparatus.

Figure 9:
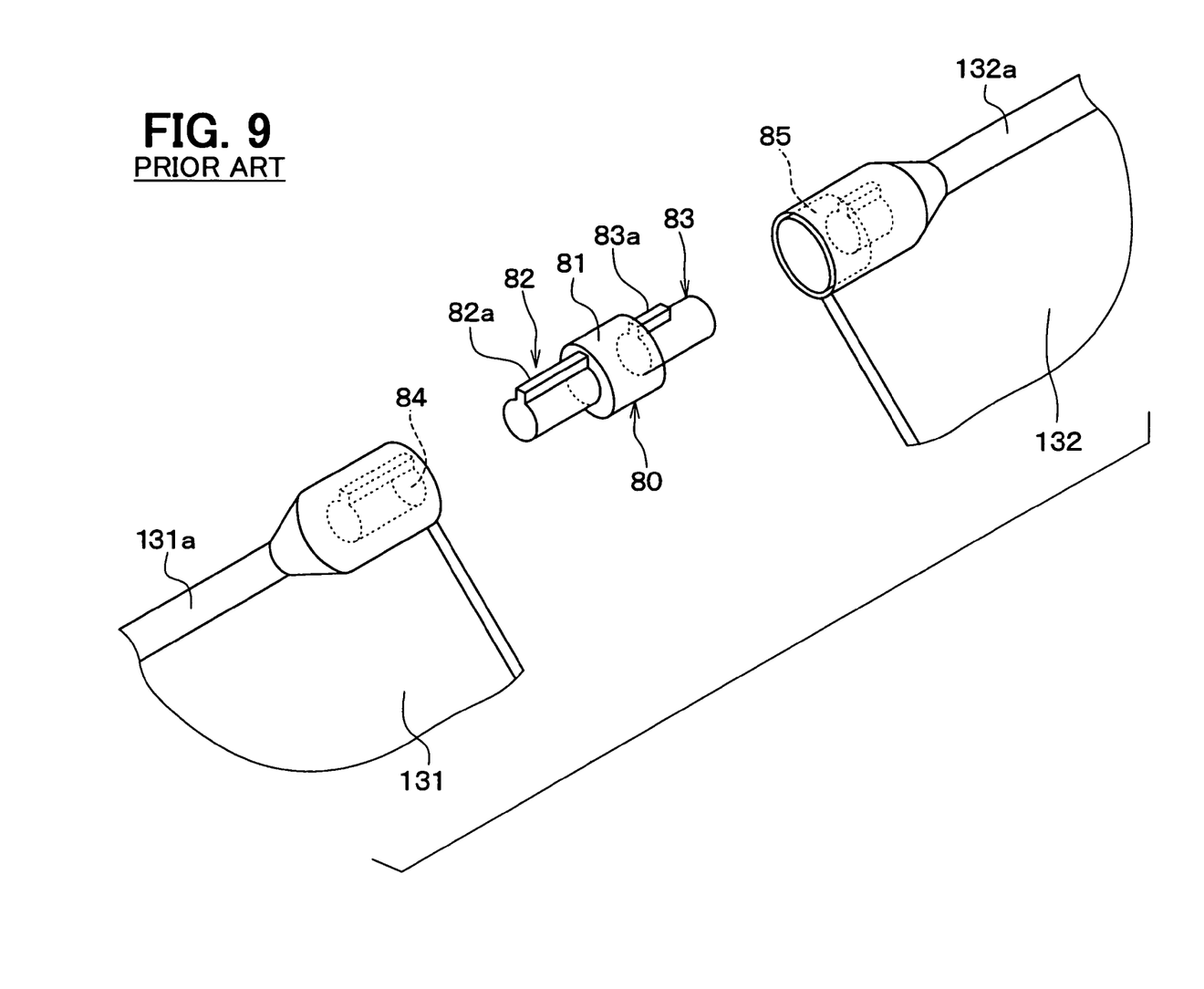
FIG. 9 is an exploded perspective view of shafts of first and second air mixing doors and a shaft receiving member of a prior art.

For example, as shown in FIG. 9, a shaft receiving member 80 is provided between a first rotation shaft 131a of a first air mixing door 131 and a second rotation shaft 132a of a second air mixing door 132. The shaft receiving member 80 includes a rotational portion 81, a first shaft receiving portion 82 extending from the rotational portion 81 and a second shaft receiving portion 83 extending from the rotational portion 81 in a direction opposite to the first shaft receiving portion 81. The shaft receiving member 80 is rotatably supported by the separation wall through the rotational portion 81.

The first and second shaft receiving portions 82, 83 are engageable with engaging holes 84, 85 of the first and second rotation shafts 131a, 132a. The first shaft receiving portion 82 and the second shaft receiving portions 83 respectively have a first projection 82a and a second projection 83a as rotation-restricting portions. An axial length of the first projection 82a is longer than that of the second projection 83a.

The engaging hole 84 of the first rotation shaft 131a is configured to receive the first shaft receiving portion 82 and the second shaft receiving portion 83 in a rotation restricted manner for restricting rotation of the shaft receiving member 80 relative to the first rotation shaft 131a. On the other hand, the engaging hole 85 of the second rotation shaft 132a is configured to rotatably receive the second shaft receiving portion 83 but to receive the first shaft receiving portion 82 in the rotation restricted manner.

When the shaft receiving member 80 is assembled in a first assembled condition where the first shaft receiving portion 82 is engaged with the engaging hole 84 of the first rotation shaft 131a and the second shaft receiving portion 83 is received in the engaging hole 85 of the second rotation shaft 132a, the first rotation shaft 131a is not rotatable relative to the shaft receiving member 80, but the second rotation shaft 132a is rotatable relative to the shaft receiving member 80.

On the other hand, when the shaft receiving member 80 is assembled in a second assembled condition where the second shaft receiving portion 83 is engaged with the engaging hole 84 of the first rotation shaft 131a and the first shaft receiving portion 82 is engaged with the engaging hole 85 of the second rotation shaft 132a, the first and second rotation shafts 131a, 132a are not rotatable relative to the shaft receiving portion 80.

Namely, in the first assembled condition, the first and second air mixing doors 131, 132 are rotatable independently from each other. In the second assembled condition, the first and second air mixing doors 131, 132 are rotatable together. As such, the first and second air mixing doors 131, 132 are used for both of the independent control-type air conditioning apparatus and the general control-type air conditioning apparatus.

In this case, however, the shaft receiving member 80 is required as an individual member. Also, the engaging holes 84, 85 of the first and second rotation shafts 131, 132 have different shapes. That is, the first and second air mixing doors 131, 132 are different components. Accordingly, the number and types of components increase, resulting an increase in costs.

SUMMARY OF THE INVENTION

The present invention is made in view of the foregoing matter, and it is an object of the present invention to provide a passage opening and closing device capable of opening and closing two passages with two doors in an independent manner and in a simultaneous manner, capable of reducing the number and types of components.

According to an aspect of the present invention, a passage opening and closing device has a case, a first door, a second door, and a shaft receiving part. The case defines a first fluid passage and a second fluid passage therein. The first door is disposed in the first fluid passage for opening and closing the first fluid passage. The second door is disposed in the second fluid passage for opening and closing the second fluid passage. The first door includes a first rotation shaft and a first door body movable with the first rotation shaft. The first rotation shaft includes a first end and a second end. The second door includes a second rotation shaft and a second door body movable with the second rotation shaft. The second rotation shaft includes a first end and a second end. The second door is disposed such that the second rotation shaft is aligned with the first rotation shaft of the first door. The shaft receiving part is configured to rotatably support at least one of the first and second ends of the first and second rotation shafts.

Further, the first ends of the first and second rotation shafts include projections projecting in an axial direction, and the second ends of the first and second rotation shafts include cylindrical portions defining engaging holes therein. The engaging holes are capable of engaging with the projections. The shaft receiving part includes a first supporting portion defining an opening that allows the projections of the first and second rotation shafts to pass through and a second supporting portion coaxially disposed relative to the first supporting portion and capable of engaging with the cylindrical portions of the first and second rotation shafts.

The first door and the second door are capable of being assembled in a first assembled condition and a second assembled condition. In the first assembled condition, the first and second doors are assembled such that the projections of the first and second rotation shafts are opposite to each other and the cylindrical portions of the first and second rotation shafts are rotatably engaged with the second supporting portion. In the first assembled condition, the first and second rotation shafts are rotatable independent from each other. In the second assembled condition, the first and second doors are assembled such that the projection of the second rotation shaft is engaged with the engaging hole of the first rotation shaft. In the second assembled condition, the second rotation shaft is restricted from rotating relative to the first rotation shaft, i.e., the second rotation shaft is rotatable with the first rotation shaft.

As such, the first door and the second door are movable independent from each other in the first assembled condition, and are movable simultaneously in the second assembled condition. Thus, the passage opening and closing device is used for independently opening and closing two passages and simultaneously opening and closing two passages only by changing assembling conditions of the first and second doors. That is, the first and second doors are used for both of an independent operation mode to be independently operated and a simultaneous operation mode to be simultaneously operated. Further, the first door and the second door have the same shape. Accordingly, the number and types of components reduces.

The passage opening and closing device are for example employed as door means for a vehicle air conditioning apparatus. Thus, the case is for example an air conditioning case, and air flows through the first and second passages. Since the first and second doors can be assembled in the first assembled condition and in the second assembled condition, the passage opening and closing device is employed to both of the independent control-type air conditioning apparatus and the general control-type air conditioning apparatus.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXAMPLE EMBODIMENT

Figure 1:
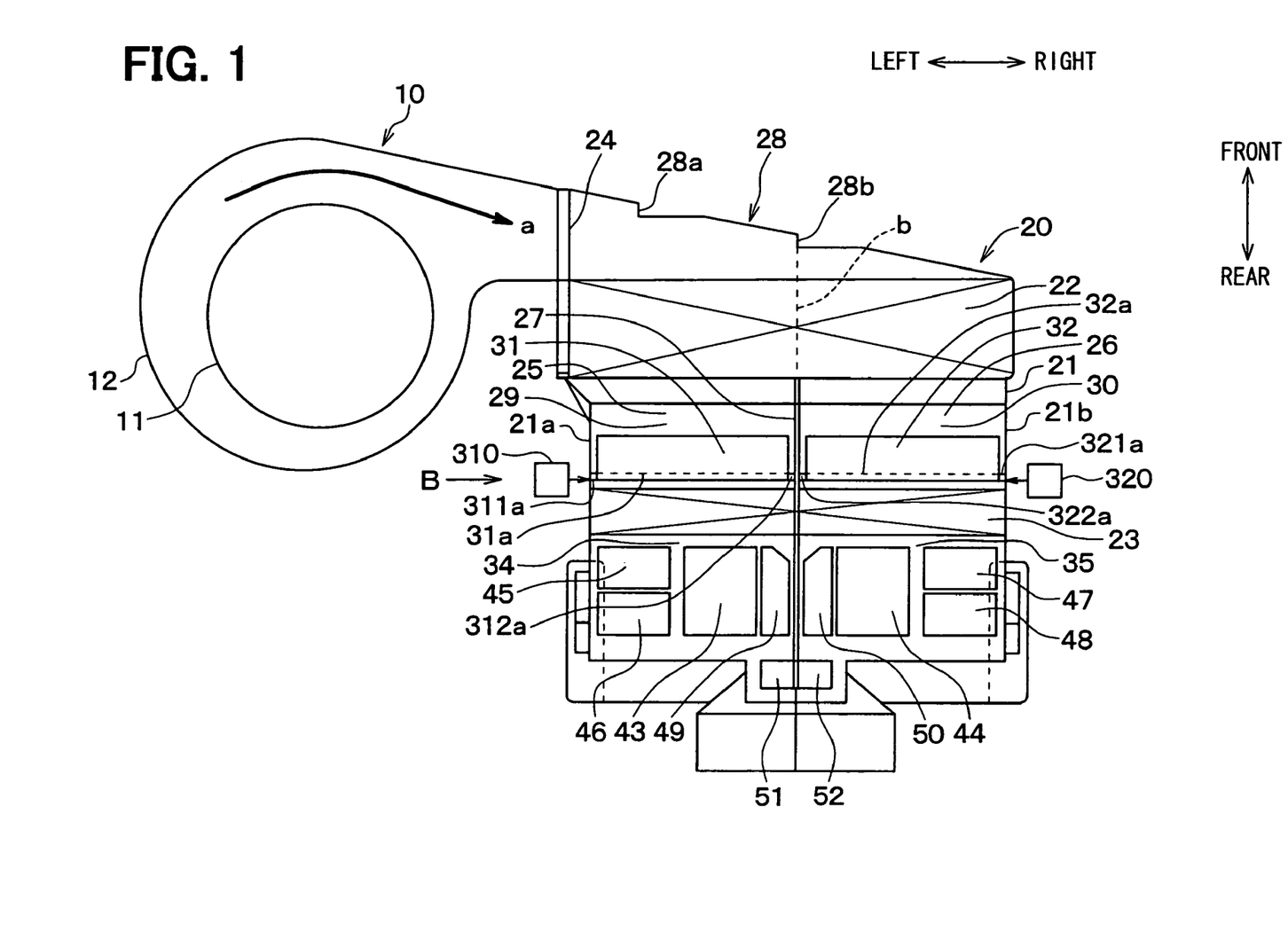
FIG. 1 is a schematic view of a blower unit and an air conditioning unit of an air conditioning apparatus according to an embodiment of the present invention.
Figure 2:
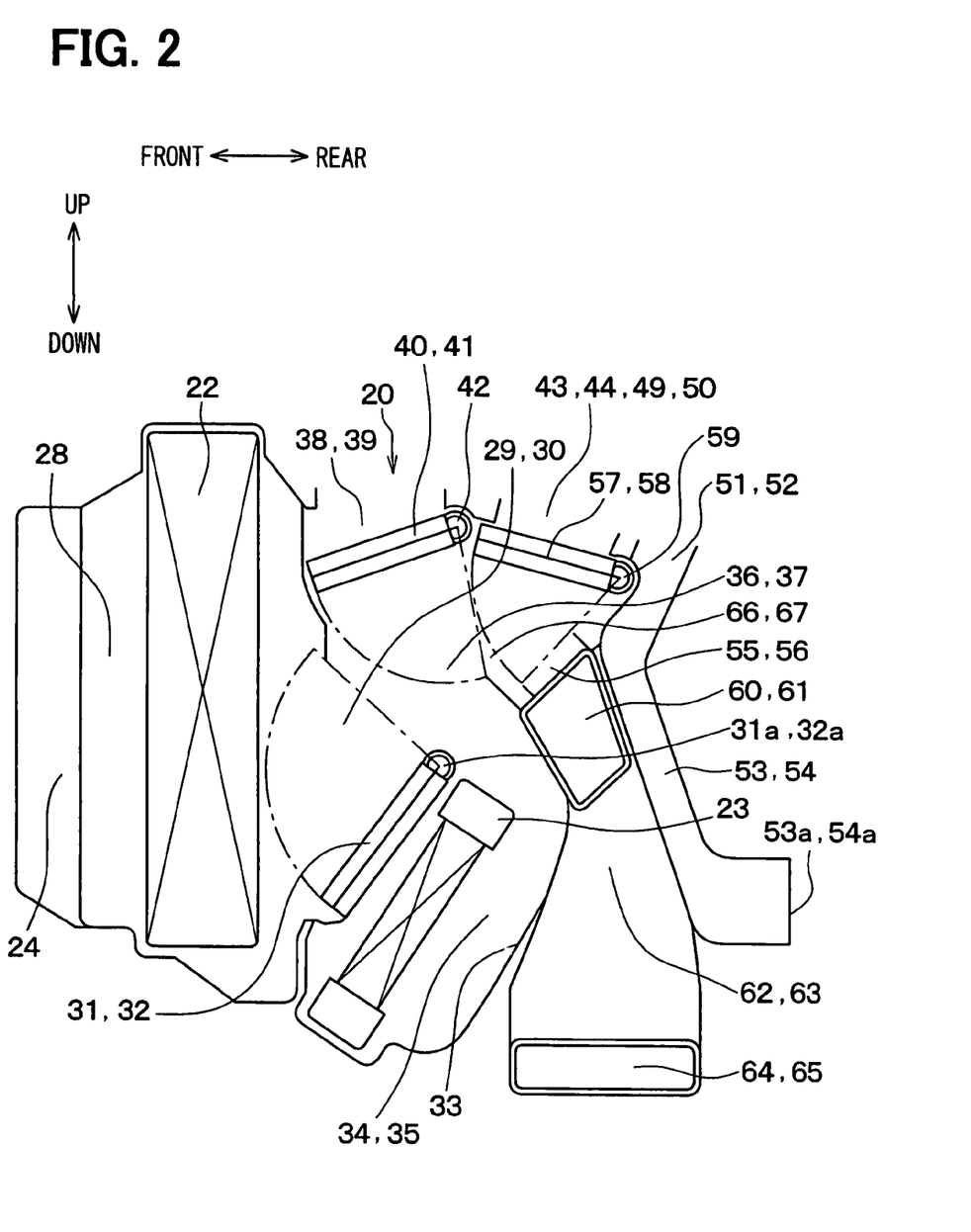
FIG. 2 is a schematic sectional view of the air conditioning unit when viewed along an arrow B in FIG. 1.

An embodiment will now be described with reference to FIGS. 1 to 8. Referring to FIGS. 1 and 2, a fluid passage opening and closing device is for example employed to open and close air passages of a vehicle air conditioning apparatus. The air conditioning apparatus generally includes a blower unit 10 and an air conditioning unit 20, and is mounted in a space defined below an instrument panel of a vehicle. For example, the air conditioning unit 20 is located at a substantially middle position in a vehicle left and right direction in the space, and the blower unit 10 is located at a position offset from the middle position to a passenger seat side in the space.

The blower unit 10 includes a blower fan 11, which is for example a centrifugal multi-blade fan (sirocco fan), and a scroll casing 12. The blower fan 11 is housed in the scroll casing 12 and driven by an electric motor (not shown). Thus, the blower fan 11 causes air to flow along a scroll passage defined in the scroll casing 12 as shown by an arrow a in FIG. 1.

The blower fan 11 has a suction port (not shown) on its top (i.e., paper front face in FIG. 1). The blower fan 11 sucks the air through an inside and outside air switching box (not shown). The inside and outside air switching box defines an inside air suction opening for drawing an inside air inside of a passenger compartment therein and an outside air suction opening for drawing an outside air outside of the passenger compartment therein. Also, the inside and outside air switching box has a switching door for switching the inside air suction opening and the outside air suction opening.

The air conditioning unit 20 generally includes an air conditioning case 21, an evaporator 22 as a heat exchanger for cooling and a heater core 23 as a heat exchanger for heating. The evaporator 22 and the heater core 23 are housed in the air conditioning case 21.

The air conditioning case 21 is made of resin, such as polypropylene, having some elasticity and sufficient strength. For example, the air conditioning case 21 is constructed of plural case members, which have joining surfaces in an up and down direction in FIG. 2 (e.g., dashed line b in FIG. 1).

The case members are for example connected to each other by fastening means such as metal spring clips and screws.

In FIGS. 1 and 2, up and down, left and right, and front and rear arrows denote directions when the air conditioning unit 20 is mounted in the vehicle. That is, the air conditioning unit 20 is mounted in a position shown by the up and down, left and right, and front and rear arrows in FIGS. 1 and 2, at the substantially middle portion in the right and left direction, under the instrument panel.

The air conditioning case 21 has an air inlet 24 at its rearmost portion. The air inlet 24 is open on a side wall of the air conditioning case 21 to be coupled with an air outlet of the scroll casing 12. Thus, the air blown by the blower unit 10 is introduced in the air conditioning case 21 through the air inlet 24.

In the air conditioning case 21, the evaporator 22 is located directly downstream of the air inlet 24 with respect to the flow of air. The evaporator 22 is arranged across a space defined in the air conditioning case 21, i.e., extends in the left and right direction in the air conditioning case 21. The evaporator 22 defines a suction face on its front side. Thus, the air passes in the evaporator 22 from the front side in a vehicle rearward direction.

The evaporator 22 performs heat exchange between a refrigerant of a refrigerant cycle and the air, thereby to cool the air. The evaporator 22 is for example a general stacked-type heat exchanger including flat tubes and corrugated fins. The flat tubes are constructed by joining metal plates such as aluminum plates in pairs. The flat tubes and the corrugated fins are alternately stacked and integrally brazed.

The heater core 23 is located downstream of the evaporator 22 with respect to the flow of air, with a predetermined space. The heater core 23 is inclined in the vehicle rearward direction. The heater core 23 reheats cooled air having passed through the evaporator 22. A hot water (e.g., an engine cooling water) flows inside of the heater core 23. Thus, the heater core 23 heats the cooled air by using heat of the hot water.

The heater core 23 is for example a general stacked-type heat exchanger including flat tubes and corrugated fins. The flat tubes are constructed by joining metal plates such as aluminum plates in pairs such as by welding. The flat tubes and the corrugated fins are alternately stacked and integrally brazed.

The air conditioning case 21 defines the space for allowing air to flow generally in the vehicle rearward direction. The space is separated into a first space 25 and a second space 26 by a separation wall 27 in the right and left direction. In the example shown in FIG. 1, the first space 25 is located on the front passenger seat side and adjacent to the blower unit 10. The second space 26 is located on a driver's seat side, i.e., on a side opposite to the blower unit 10 with respect to the first space 25.

The separation wall 27 extends from a downstream portion of the evaporator 22 to a position downstream of the heater core 23 through the heater core 23 in the front and rear direction. In this example, the separation wall 27 is made of resin and is formed separately from the case members of the air conditioning case 21. The separation wall 27 is formed with a notch at a position corresponding to the heater core 23 to avoid interference with the heater core 23. Alternatively, the separation wall 27 may be integrally formed with the air conditioning case 21.

The heater core 23 is arranged across the first and second spaces 25, 26, as shown in FIG. 1. The heater core 23 is arranged such that a flat surface of one of flat tubes or a fin surface of one of the corrugated fins is aligned with the separation wall 27. Thus, the heater core 23 is divided into two sections. A first section is located in the first space 25 and a second section is located in the second space 26.

The air conditioning case 21 includes an air guide wall 28 at a position upstream of the evaporator 22, i.e., on a front side of the evaporator 22. The air guide wall 28 has a stepwise shape that reduces a space between itself and the suction face of the evaporator 22 with a distance from the air inlet 24. That is, the air guide wall 28 is inclined in the vehicle rearward direction with the distance from the air inlet 24. In the example shown in FIG. 1, the air guide wall 28 includes two stepped portions 28a, 28b. The stepped portions 28a, 28b extend in the front and rear direction to facilitate changing of an air flow direction from a vehicle rightward direction into the vehicle rearward direction.

In the first and second spaces 25, 26 of the air conditioning case 21, a first cooled air bypass passage (first fluid passage) 29 and a second cooled air bypass passage (second fluid passage) 30 are formed respectively at positions above the heater core 23. The first and second cooled air bypass passages 29, 30 allow the cooled air to bypass the heater core 23.

Further, as first and second door means, a first air mixing door 31 and a second air mixing door 32 are provided in the first space 25 and the second space 26, respectively, at positions between the evaporator 22 and the heater core 23. The first and second air mixing doors 31, 32 are for example plate doors including door bodies in the form of plate. The first and second air mixing doors 31, 32 are operable to adjust the volume of air to be introduced into the heater core 23 to be heated and the volume of air to be introduced into the first and second cooled air bypass passages 29, 30. The first and second air mixing doors 31, 32 are rotatable about a rotation axis D1.

The first air mixing door 31 includes a first rotation shaft 31a. The first rotation shaft 31a is integrated with the door body of the first air mixing door 31. Likewise, the second air mixing door 32 includes a second rotation shaft 32a. The second rotation shaft 32a is integrated with the door body of the second air mixing door 32. The first rotation shaft 31a and the second rotation shaft 32a are aligned in the vehicle left and right direction.

The first rotation shaft 31a includes a first projecting end (first end) 311a and a first recessing end (second end) 312a opposite to the first projecting end 311a. Likewise, the second rotation shaft 32a includes a second projecting end (first end) 321a and a second recessing end (second end) 32a opposite to the second projecting end 321a. The first and second projecting ends 311a, 321a are rotatably supported by the air conditioning case 21 and operably coupled to actuators 310, 320 such as servomotor as air blowing mode switching devices, respectively. The first recessing end 312a and the second recessing end 322a are rotatably supported through the separation wall 27.

The door bodies of the first and second air mixing doors 31, 32 are rotatable with the first and second rotation shafts 31a, 32a, respectively, in the vehicle up and down direction. The first and second air mixing doors 31, 32 are separately or integrally operable to adjust the volumes of air into the first and second cooled air bypass passages 29, 30 and the first and second sections of the heater core 23. Thus, the first and second air mixing doors 31, 32 provide temperature adjusting means for independently or simultaneously adjust temperatures of air blown from the first and second spaces 25, 26.

The air conditioning case 21 includes a wall 33 at a position downstream of the heater core 23 with respect to the flow of air, i.e., on a rear side of the heater core 23. The wall 23 generally extends in the vehicle up and down direction, and is spaced from the heater core 23 to provide a first heated air passage 34 and a second heated air passage 35 in the first space 25 and the second space 26, respectively. Thus, the wall 23 directs the air heated by the heater core 23 in an upward direction, at a position directly downstream of the heater core 23.

The first and second heated air passages 34, 35 merge with the first and second cooled air bypass passages 29, 30, respectively, at positions above the heater core 23. Thus, the air conditioning case 21 provides a first air mixing area 36 and a second air mixing area 37 for mixing the cooled air bypassing the heater core 23 and the heated air heated by the heater core 23 at the positions above the heater core 23, in the first space 25 and the second space 26, respectively.

The air conditioning case 21 is formed with a first defroster opening 38 and a second defroster opening 39 on its top wall, at positions corresponding to the first space 25 and the second space 26, respectively. The first and second defroster openings 38, 39 are open at positions downstream of the first and second air mixing areas 36, 37, respectively. Thus, the air, the temperature of which has been controlled in the first and second air mixing area 36, 37, flows in the first and second defroster openings 38, 39.

The first and second defroster openings 38, 39 are in communication with defroster blowing ports, which are open toward an inner surface of a windshield of the vehicle, through defroster ducts (not shown). Thus, the air, which has been conditioned in the first and second air mixing areas 36, 37, is blown off from the defroster blowing ports.

The air conditioning case 21 is provided with a first defroster door (blowing mode switching door) 40 and a second defroster door (blowing mode switching door) 41 for opening and closing the first defroster opening 38 and the second defroster opening 39, respectively. The first and second defroster doors 40, 41 are simultaneously operated by a rotation shaft 42 that horizontally extends at a position adjacent to an upper portion of the air conditioning case 21.

When the first and second defroster doors 40, 41 are moved to a position shown by alternate long and short dashed lines in FIG. 2, the first and second defroster openings 38, 39 are fully open and first and second communication openings 66, 67 are fully closed. The first and second communication openings 66, 67 are formed in the first and second spaces 25, 26, respectively, for allowing the air to flow from the first and second air mixing areas 36, 37 toward later-described face and foot openings.

The air conditioning case 21 is further formed with face openings 43 to 52 on its upper wall. The face openings 43 to 52 are located on a rear side of the first and second defroster openings 38, 39 with respect to the vehicle front and rear direction. In the example shown in FIG. 1, the air conditioning case 21 has ten defroster openings. The air from the first and second air mixing areas 36, 37 are introduced to center face openings 43, 44, 49, 50 of the face openings 43 to 52 through the first and second communication openings 66, 67.

The left center face opening 43 and the right center face opening 44 are in communication with center face blowing ports that are open at upper middle portions of the instrument panel through center face ducts. The air is blown off from the center face blowing ports toward an upper middle area of the passenger compartment.

Side face openings 45 to 48 of the face openings are located on the left and right sides of the center face openings 43, 44. Side face ducts are coupled to the side face openings 45 to 48. Thus, the side face openings 45 to 48 are in communication with side face blowing ports that are open at left and right ends of the instrument panel through the side face ducts. The air is blown off from the side face blowing ports toward an upper area of the passenger compartment or toward the inner surface of the windshield, at the left and right ends of the passenger compartment.

In general, air blowing direction adjusting devices are attached to the side face blowing ports. Thus, the direction of air blown from the side face blowing ports are adjustable by manually operating air guide plates of the air blowing direction adjusting devices, between the direction toward an upper body of a passenger and the direction toward the inner surface of the windshield.

The left and right side face openings 45 to 48 are directly in communication with the first and second air mixing areas 36, 37. Therefore, the air from the first and second air mixing areas 36, 37 are normally blown from the left and right side face openings in any blowing modes, irrespective of positions of the defroster doors 40, 41 and foot and face switching doors (blowing mode switching doors) 57, 58.

A left rear face opening 49 and a right rear face opening 50, which are located more to the center than the left and right center face openings 43, 44, are in communication with auxiliary rear face openings 51, 52 through ducts (not shown) that are coupled outside of the air conditioning case 21. The auxiliary rear face openings 51, 52 are in communication with rear face passages 53, 54 that are formed in the air conditioning case 21.

The rear face passages 53, 54 are formed at a rear portion of the air conditioning case 21. Ends of rear face ducts (not shown) are coupled to downstream ends 53a, 54a of the rear face passages 53, 54. The opposite ends of the rear face ducts provide rear face blowing openings for blowing the air toward upper areas of rear passenger's seats.

The air conditioning case 21 further has a left foot air inlet 55 and a right foot air inlet 56 in the first space 25 and the second space 26, respectively. The left foot air inlet 55 and the right foot air inlet 56 provide openings at positions downstream of the first and second air mixing areas 36, 37. The left foot air inlet 55 is disposed to oppose the left center face opening 43 and the left rear face opening 49. Likewise, the right foot air inlet 56 is disposed to oppose the right center face opening 44 and the right rear face opening 50.

The foot and face switching doors 57, 58 are operated to open and close the left and right foot air inlets 55, 56. The foot and face switching doors 57, 58 share a single rotation shaft 59 to be rotated together.

The air conditioning case 21 further has front seat foot openings 60, 61, rear seat foot passages 62, 63 and rear seat foot openings 64, 65 at positions downstream of the left and right foot air inlets 55, 56. Thus, the air having passed through the left and right foot air inlets 55, 56 flows toward the front seat foot openings 60, 61, enters front seat foot ducts (not shown) and is then blown toward lower areas of front seats from front seats blowing ports.

The air having passed through the left and right foot air inlets 55, 56 also flows into the rear seat foot passages 62, 63 and toward the rear seat foot openings 64, 65. This air further flows through rear seat foot ducts (not shown) and is then blown from rear seat blowing ports toward lower areas of the rear seats.

The defroster doors 40, 41 and the foot and face switching doors 57, 58 serve as door means for switching blowing modes. The defroster doors 40, 41 and the foot and face switching doors 57, 58 are operably coupled to the actuators (e.g., servomotors) for switching the blowing modes through the linking mechanisms (not shown). Thus, the defroster doors 40, 41 and the foot and face switching doors 57, 58 are operated by the actuators.

Figure 3:
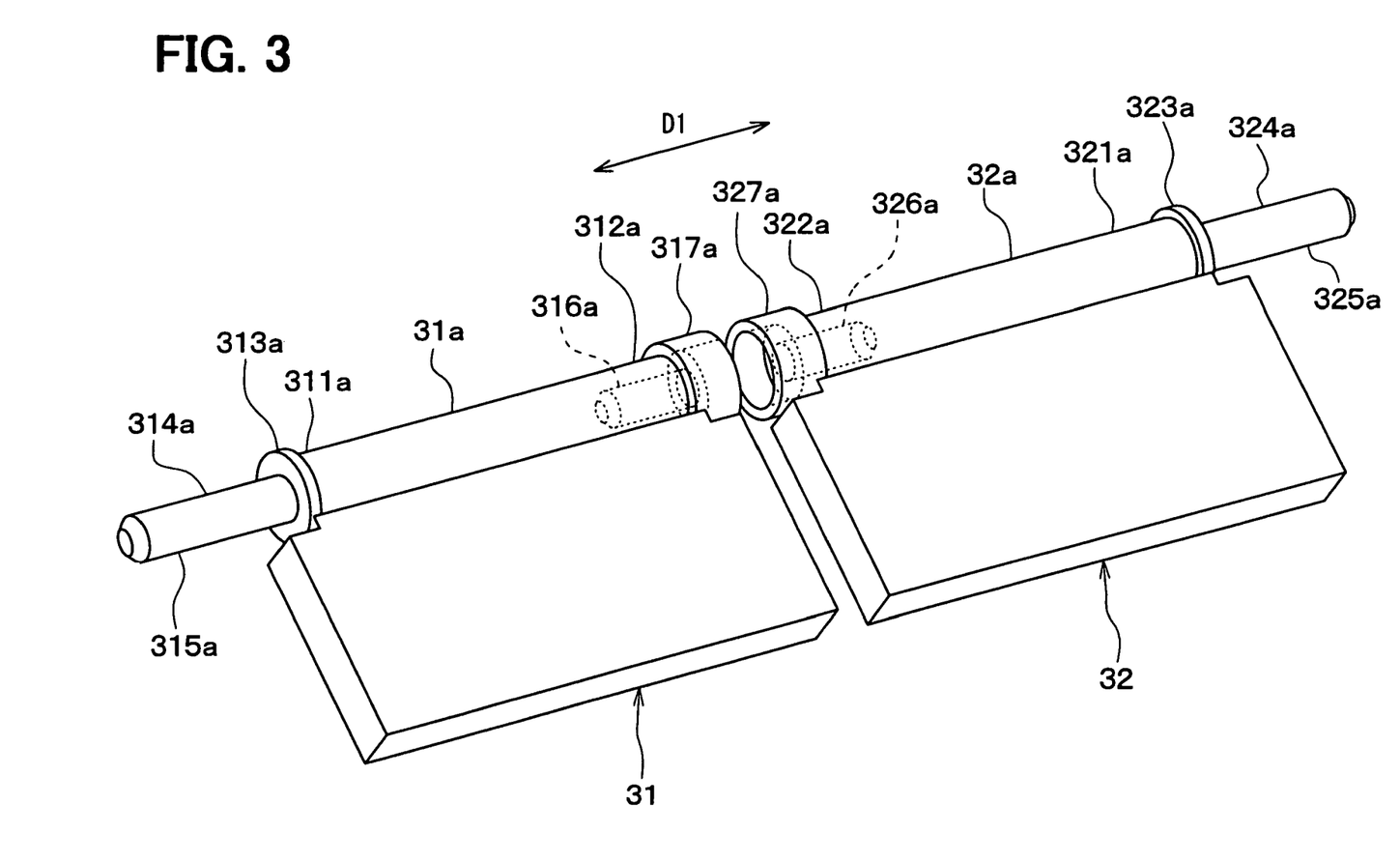
FIG. 3 is a perspective view of a first air mixing door and a second air mixing door, when the first and second air mixing doors are assembled in a first assembled condition to be independently operated, according to the embodiment.

Next, structures of the first and second air mixing doors 31, 32 relative to the air conditioning case 21 and the separation wall 27 will be described in detail with reference to FIGS. 3 to 6B. Referring to FIG. 3, the first air mixing door 31 and the second air mixing door 32 have the same shape.

The first and second projecting ends 311a, 321a of the first and second air mixing doors 31a, 32a respectively include flanges 313a, 323a and projections 314a, 324a. The flanges 313a, 323a expand in the form of flange. The projections 314a, 324a extend from the flanges 313a, 323a in the axial direction D1. Each of the projections 314a, 324a has a circular-shaped cross-section.

Figure 4A:
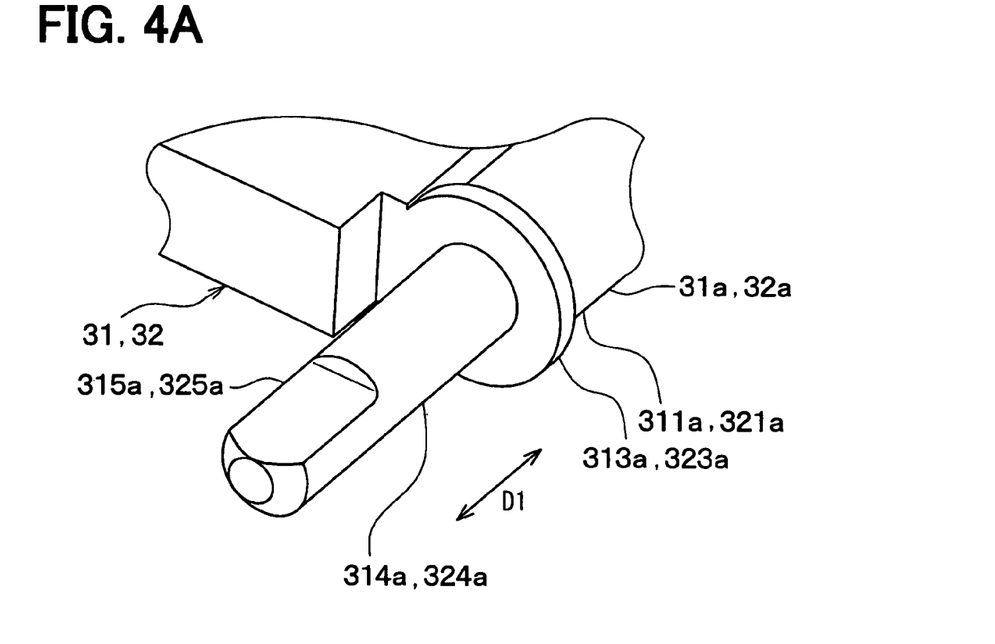
FIG. 4A is a partial enlarged perspective view of a projecting end of a rotation shaft of the first/second air mixing door according to the embodiment.

Referring to FIG. 4A, the projections 314a, 324a have an outer diameter smaller than an outer diameter of the middle portions of the first and second rotation shafts 31a, 32a, the middle portions extend to the door bodies. The projections 314a, 324a include rotation-restricting portions 315a, 325a at ends thereof. Thus, each projection 314a, 324a has a non-circular-shaped cross-section at the respective end. For example, the end of the projection 314a, 324a has a D-shaped cross-section to provide the rotation-restricting portions 315a, 325a.

Figure 4B:
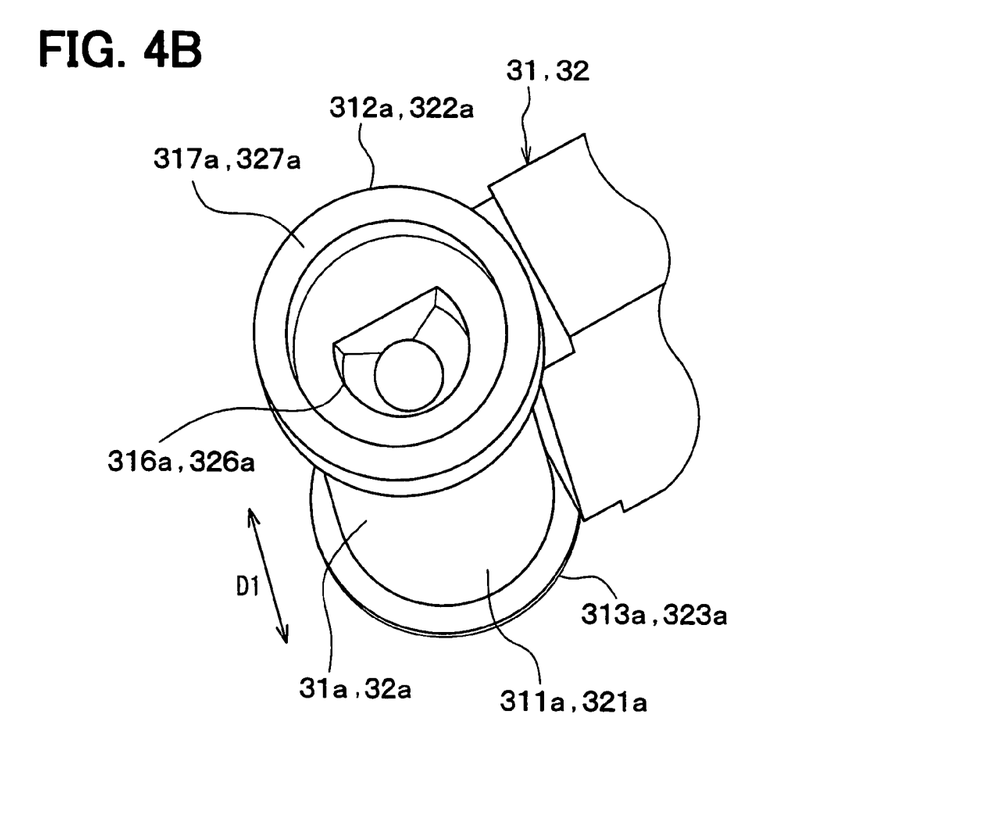
FIG. 4B is a partial enlarged perspective view of a recessing end of the rotation shaft of the first/second air mixing door according to the embodiment.

Referring to FIG. 4B, the first and second recessing ends 312a, 322a of the first and second rotation shafts 31a, 32a are formed with engaging holes 316a, 326a. The engaging holes 316a, 326a coaxially extend with the projecting ends 311a, 321a and have a non-circular-shaped cross-section (e.g., D-shaped cross-section) to engage with the rotation-restricting portions 315a, 325a.

Further, the first and second recessing ends 311a, 321a include cylindrical portions 317a, 327a. The cylindrical portions 317a, 327a define openings to communicate with the engaging holes 316a, 326a.

Figure 5:
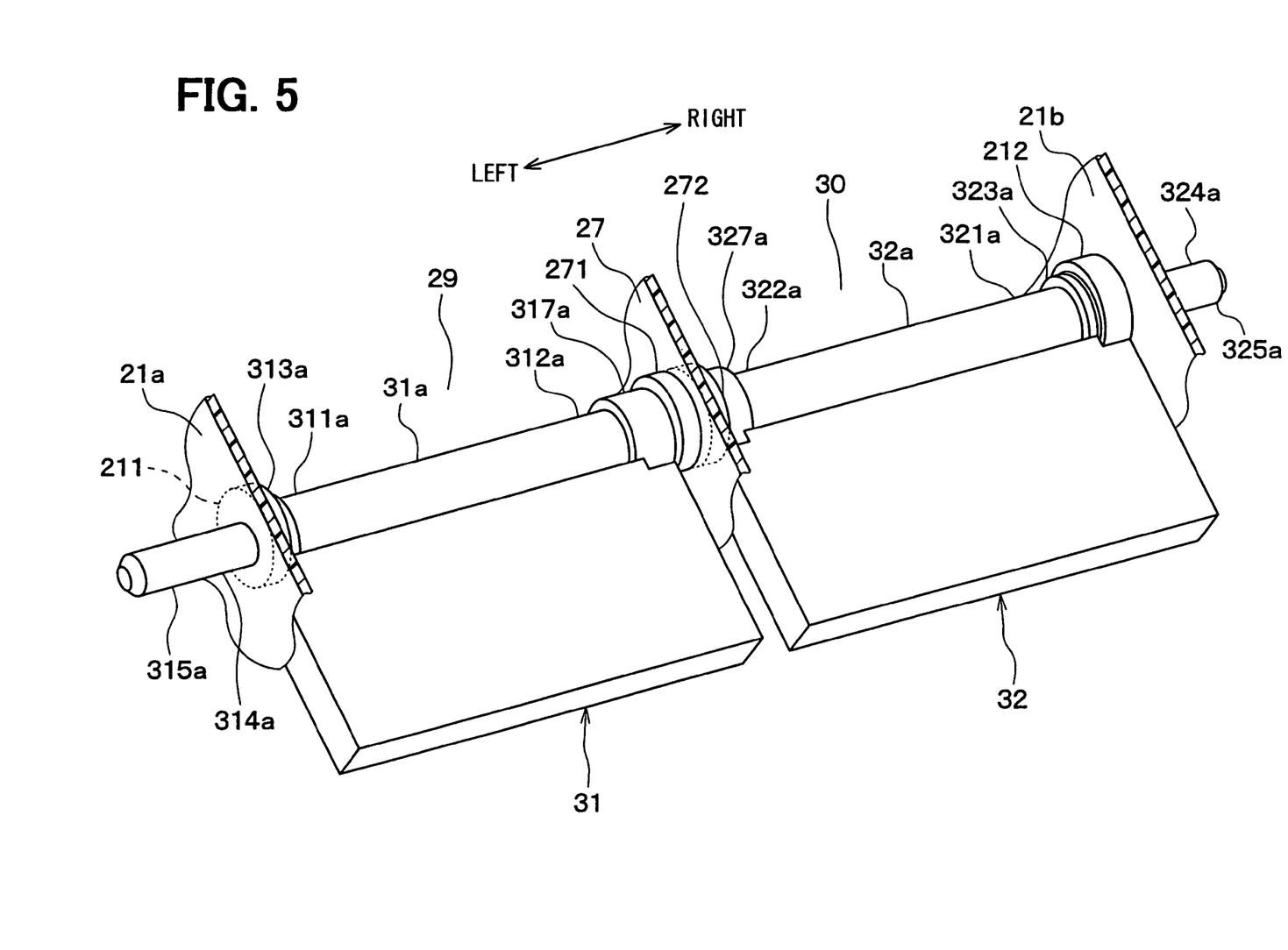
FIG. 5 is a perspective view of the first and second air mixing doors with an air conditioning case and a separation wall, when the first and second air mixing doors are assembled in the first assembled condition, according to the embodiment.

Referring to FIG. 5, a left side wall 21a and a right side wall 21b of the air conditioning case 21 are integrally formed with a first shaft receiving portion 211 and a second shaft receiving portion 212, respectively. Also, the separation wall 27 is integrally formed with a third shaft receiving portion 271 and a fourth shaft receiving portions 272.

Figure 6A:
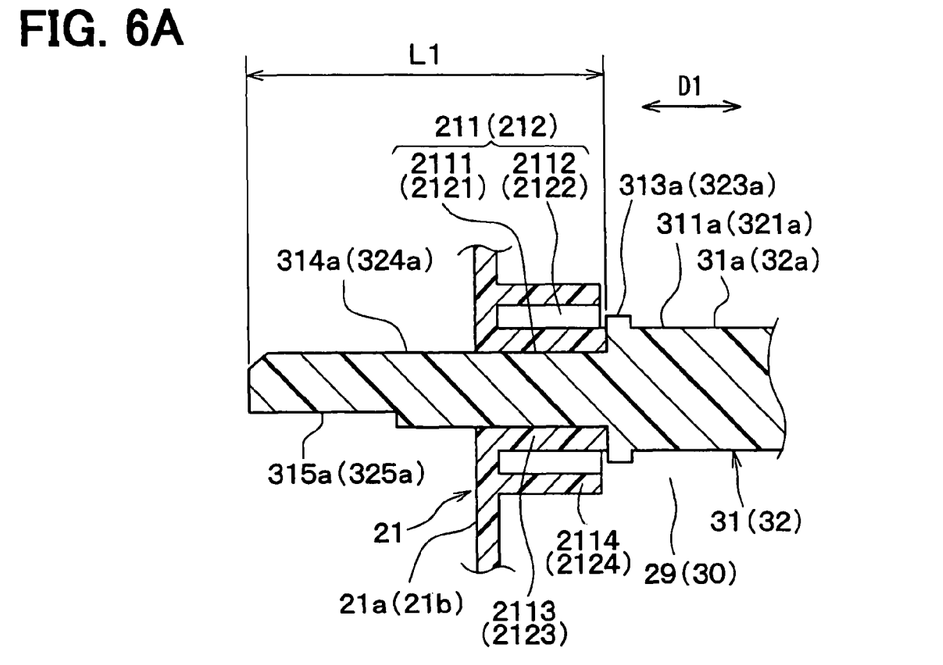
FIG. 6A is a partial cross-sectional view of the projecting end of the rotation shaft and the air conditioning case, when the first and second air mixing doors are assembled in the first assembled condition, according to the embodiment.
Figure 6B:
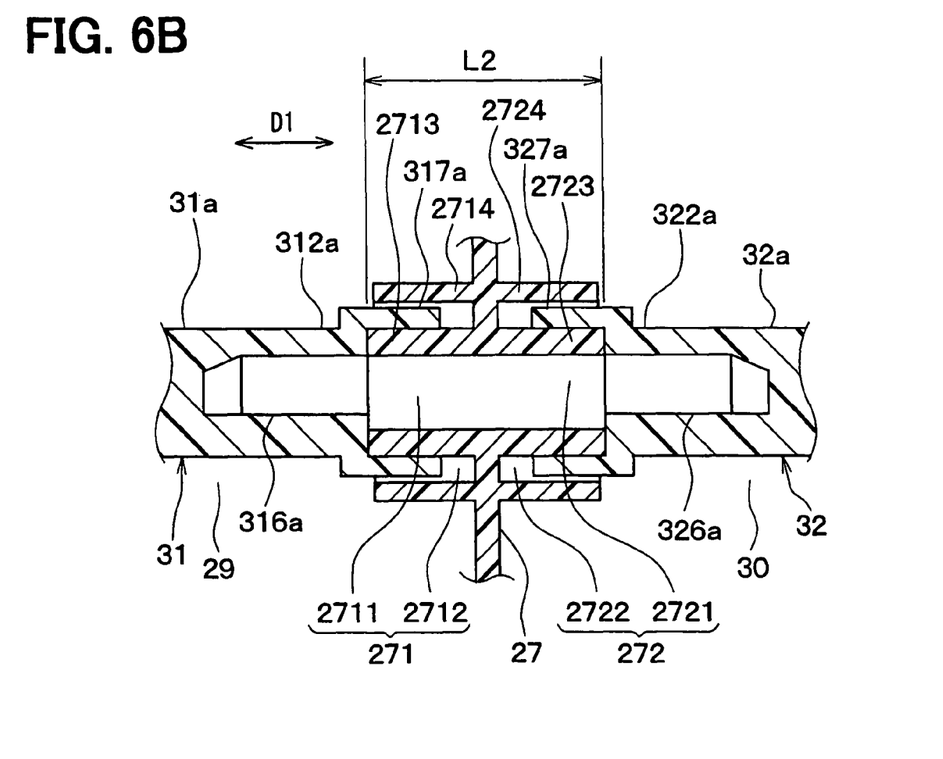
FIG. 6B is a partial cross-sectional view of the receiving ends of the rotation shafts and the separation wall, when the first and second air mixing doors are assembled in the first assembled condition, according to the embodiment.

Referring to FIG. 6A, the first shaft receiving portion 211 includes a first supporting portion 2111 and a second supporting portion 2112. Likewise, the second shaft receiving portion 212 includes a first supporting portion 2121 and a second supporting portion 2122. The first shaft receiving portion 211 and the second shaft receiving portion 212 have the same structure. Thus, reference numbers showing respective portions of the second shaft receiving portion 212 are denoted in parentheses in FIG. 6A. Referring to FIG. 6B, each of the third shaft receiving portion 271 and the fourth shaft receiving portion 272 includes a first supporting portion 2711, 2721 and a second supporting portion 2712, 2722.

The first supporting portions 2111, 2121, 2711, 2721 define through holes for allowing the projections 314a, 324a of the first and second projecting ends 311a, 321a to pass through.

The second supporting portions 2112, 2122, 2712, 2722 are coaxially formed on a radial outside of the first supporting portions 2111, 2121, 2711, 2721. The second supporting portions 2112, 2122, 2712, 2722 are capable of engaging with the cylindrical portions 317a, 327a of the first and second recessing ends 312a, 322a.

Specifically, the first and second shaft receiving portions 211, 212 extend from inner surface of the left and right side walls 21a, 21b to oppose to the third and fourth shaft receiving portions 271, 272, respectively. Also, each of the first and second shaft receiving portions 211, 212 has a coaxial double cylindrical structure that includes an inner cylinder 2113, 2123 and an outer cylinder 2114, 2124 and defines an axis parallel to the rotation axis D1 of the rotation shaft 31a, 32a.

The first supporting portions 2111, 2121 are provided by radial inner surfaces of the inner cylinders 2113, 2123, respectively. The second supporting portions 2112, 2122 are provided by radial outer surfaces of the inner cylinders 2113, 2123 and radial inner surfaces of the outer cylinders 2114, 2124, respectively.

The third and fourth shaft receiving portions 271, 272 extend in opposite directions relative to each other from the separation wall 27 as a middle shaft receiving portion. Also, each of the third and fourth shaft receiving portions 271, 272 has a coaxial double cylindrical structure that includes an inner cylinder 2713, 2723 and an outer cylinder 2714, 2724 and defines an axis parallel to the rotation axis D1 of the rotation shaft 31a, 32a.

The first supporting portions 2711, 2721 are provided by radial inner surfaces of the inner cylinders 2713, 2723. The second supporting portions 2712, 2722 are provided by radial outer surfaces of the inner cylinders 2713, 2723 and radial inner surfaces of the outer cylinders 2714, 2724.

As shown in FIGS. 6A and 6B, the length L1 of each projection 314a, 423a is greater than a total axial length L2 of the third and fourth shaft receiving portions 271, 272, with respect to the axial direction D1.

In a case that the first and second air mixing doors 31, 32 are used for an independent air conditioning operation for independently controlling the temperatures of the right and left areas of the passenger compartment, the first and second air mixing doors 31, 32 are assembled in a first assembled condition shown in FIGS. 6A and 6B such that the first and second air mixing doors 31, 32 are movable independent of each other.

Specifically, the projections 314a, 324a of the first and second projecting ends 314a, 324a are supported by the first supporting portions 2111, 2121 of the first and second shaft receiving portions 211, 212, respectively. Further, the cylindrical portions 317a, 327a of the first and second recessing ends 312a, 322a are supported by the second supporting portions 2712, 2722 of the third and fourth shaft receiving portions 271, 272, respectively.

In other words, in the first assembled condition, the cylindrical portion 317a, 327a of the first and second recessing ends 312a, 322a are rotatably engaged with the second supporting portions 2712, 2722 of the third and fourth shaft receiving portions 271, 272, respectively. Further, the projections 314a, 324a of the first and second projecting ends 311a, 321a rotatably pass through the first supporting portions 2111, 2121 of the first and second shaft receiving portions 211, 212, respectively.

Accordingly, the first and second projecting ends 311a, 321a of the first and second rotation shafts 31a, 32a are rotatably supported by the first and second shaft receiving portions 211, 212 of the air conditioning case 21, and the first and second recessing ends 312a, 322a of the first and second rotation shafts 31a, 32a are rotatably supported by the third and fourth shaft receiving portions 271, 272 of the separation wall 27. Thus, the first and second rotation shafts 31a, 32a are rotatable independent of each other. As such, the first air mixing door 31 and the second air mixing door 32 are independently movable.

Figure 7:
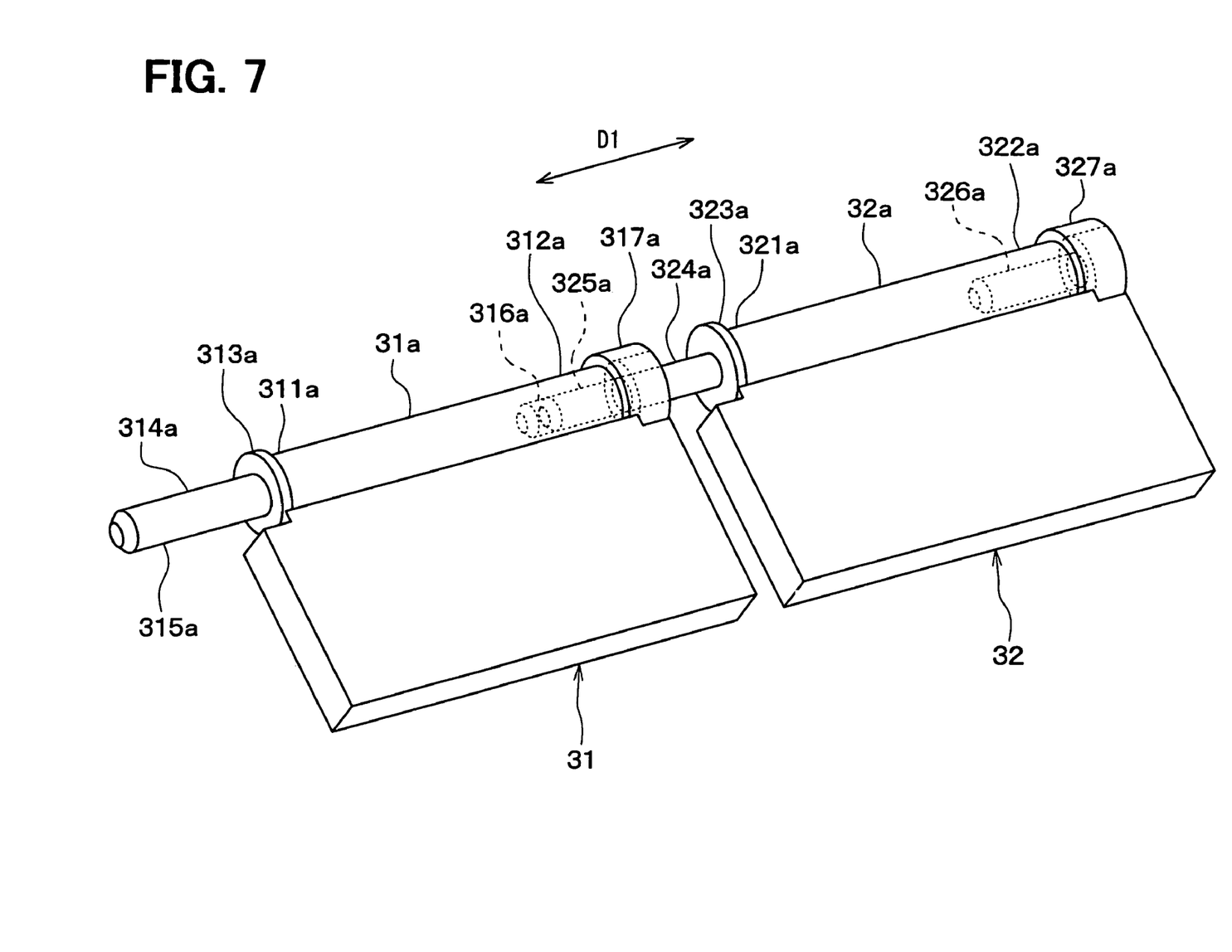
FIG. 7 is a perspective view of the first and second air mixing doors when the first and second air mixing doors are assembled in a second assembled condition to be simultaneously operated, according to the embodiment.
Figure 8A:
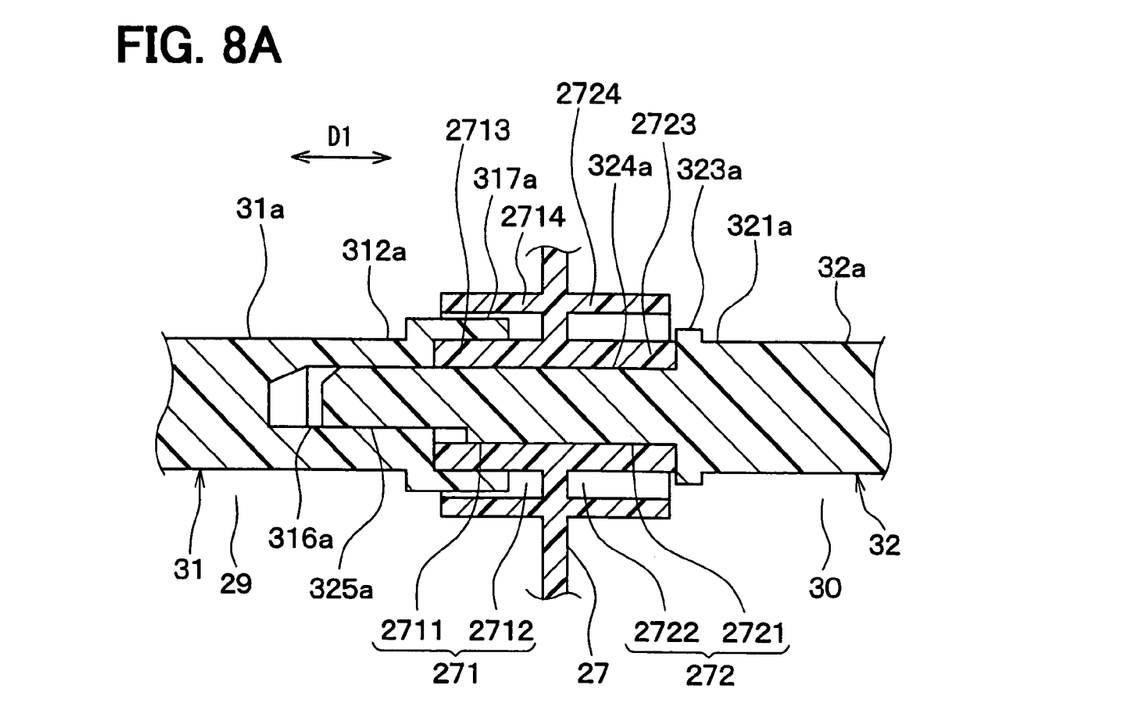
FIG. 8A is a partial cross-sectional view of the rotation shafts of the first and second air mixing doors and the separation wall, when the first and second air mixing doors are assembled in the second assembled condition, according to the embodiment.
Figure 8B:
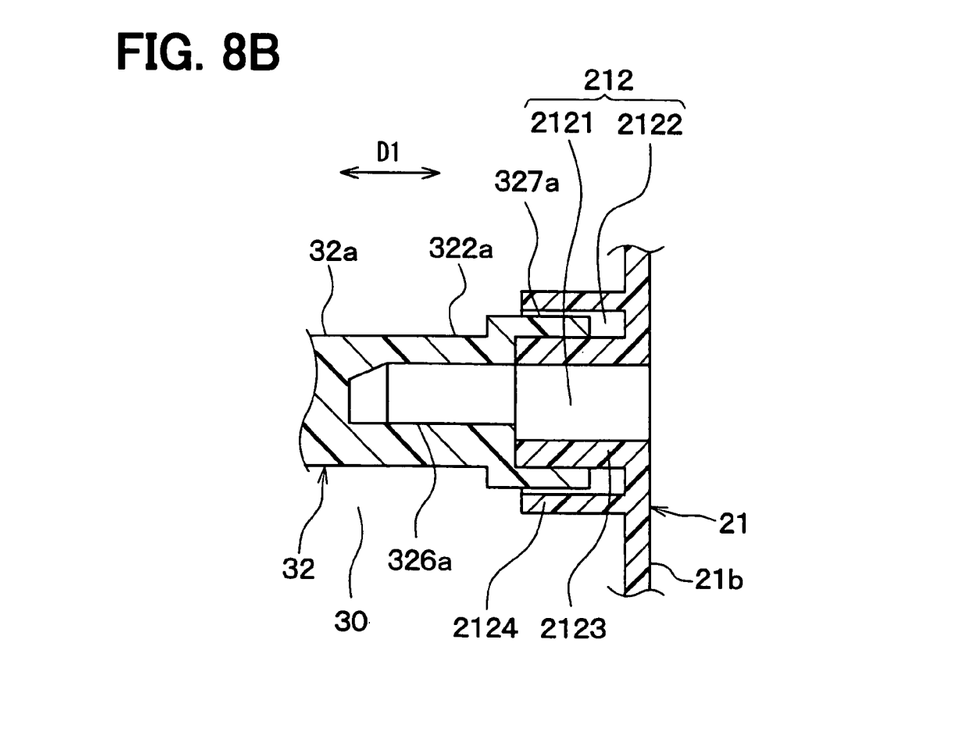
FIG. 8B is a partial cross-sectional view of the rotation shaft of the second air mixing door and the air conditioning case, when the first and second air mixing doors are assembled in the second assembled condition, according to the embodiment.

On the other hand, in a case that the first and second air mixing doors 31, 32 are used for a simultaneous air conditioning operation in which the temperatures of the left and right areas of the passenger compartment are not separately controlled, i.e., the airs having the same temperature are blown from the first and second spaces 25, 26, the first and second air mixing doors 31, 32 are assembled in a second assembled condition shown in FIGS. 7, 8A and 8B such that the first and second air mixing doors 31, 32 are movable simultaneously.

Namely, the first rotation shaft 31a is supported in the similar manner as the first assembled condition shown in FIG. 5. On the other hand, the second rotation shaft 32 is supported in an opposite manner to the first assembled condition shown in FIG. 5.

Specifically, the second rotation shaft 32a is supported such that the projection 324a of the second projecting end 321a is received by the first supporting portion 2721 of the fourth shaft receiving portion 272, and the cylindrical portion 327a of the second recessing end 322a is received by the second supporting portion 2122 of the second shaft receiving portion 212.

Accordingly, in the second assembled condition, the cylindrical portion 317a of the first recessing end 312a is rotatably engaged with the second supporting portion 2712 of the third shaft receiving portion 271, and the projection 314a of the first projecting end 311a rotatably passes through the first supporting portion 2111 of the first shaft receiving portion 211. Further, the projection 324a of the second projecting end 321a rotatably passes through the fourth and third shaft receiving portions 271, 272, and the cylindrical portion 327a of the second recessing end 322a is rotatably engaged with the second supporting portion 2122 of the second shaft receiving portion 212.

As described in the above, the projections 314a, 324a of the first and second projecting ends 311a, 321a have the length L1 that is greater than the total axial length L2 of the third and fourth shaft receiving portions 271, 272. Therefore, the projection 324a of the second rotation shaft 32a passes through the third and fourth shaft receiving portions 271, 272, and the rotation-restricting portion 325a of the projection 324a engages with the engaging hole 316a of the first recessing end 312a of the first rotation shaft 31a. Accordingly, the second projecting end 321a of the second rotation shaft 32a is restricted from rotating relative to the first recessing end 312a of the first rotation shaft 31a.

The second projecting end 321a is supported rotatable relative to the fourth shaft receiving portion 272 of the separation wall 27. The second recessing end 322a of the second rotation shaft 32a is supported rotatable relative to the second shaft receiving portion 212 of the air conditioning case 21. Therefore, the second rotation shaft 32a is rotatable with the first rotation shaft 31a. As such, the first air mixing door 31 and the second air mixing door 32 are movable together.

Accordingly, the first rotation shaft 31a and the second rotation shafts 32a are used for both of the independent air conditioning operation and the simultaneous air conditioning operation. Namely, the independent control-type air conditioning apparatus is employed to the general control-type air conditioning apparatus by assembling the first and second air mixing doors 31, 32 in different assembled conditions.

Further, the shaft receiving member 80 shown in FIG. 9 is not required between the first and second rotation shafts 31a, 32a. Thus, the number of parts reduces, and hence costs reduces.

Since the first and second rotation shafts 31a, 32a have the same shape, the first and second air mixing doors 31, 32 have the same shape. Therefore, the number of types of parts reduces, as compared with the case shown in FIG. 9 in which the first and second rotation shafts 131a, 132a have different shapes and thus the first and second air mixing doors 131, 132 are different.

In the air conditioning apparatus of the temperature independent control-type, air conditioner operation panels are separately provided for controlling the temperatures of the right and left areas independently. Further, two actuators 310, 320 are provided for respectively controlling the first and second air mixing doors 31, 32. In response to operations of various operation members (e.g., switches) of the operation panels, operation signals are inputted to an electronic control unit (not shown). Also, sensor signals from various sensors for the air conditioning operation are inputted to the electronic control unit.

Based on signals outputted from the electronic control unit, rotations of the actuators 310, 320 are respectively operated such that the positions of the first and second air mixing doors 31, 32 are independently adjusted. As such, the temperatures of the air in the first and second spaces 25, 26 are independently controlled. Thus, the temperatures of the air blown into the left and right areas of the passenger compartment are independently controlled to desired levels.

In the air conditioning apparatus that does not independently control the temperatures of the left and right areas of the passenger compartment, one air conditioner operation panel may be provided. Also, only one actuator 310 is provided for simultaneously operating the first and second air mixing doors 31, 32. In response to operations of various operation members (e.g., switches) of the operation panels, operation signals are inputted to the electronic control unit (not shown). Also, sensor signals from various sensors for the air conditioning operation are inputted to the electronic control unit. Based on signals outputted from the electronic control unit, the actuator 310 is operated such that the positions of the first and second air mixing doors 31, 32 are simultaneously adjusted. Thus, the temperatures of the air in the first and second spaces 25, 26 are controlled to the same level.

(Modifications)

In the above embodiment, the left and right blowing mode switching doors such as the left and right defroster doors 40, 41 and the left and right face and foot switching doors 57, 58 are constructed to share the rotation shafts 42, 59. Instead, the left and right blowing mode switching doors may be constructed to have individual rotation shafts. Further, the above shaft end structures such as the projections 314a, 324a, the engaging holes 316a, 326a, the cylindrical portions 317a, 327a and the shaft receiving structures such as the first to fourth shaft receiving portions 211, 212, 271, 272 are employed. In this case, therefore, the left and right blowing mode switching doors can be assembled to be independently operated or simultaneously operated.

Also, in the case that the shaft end structures are employed to the right and left blowing mode switching doors, instead of having the first and second air mixing doors 31, 32, two heater cores may be provided in the first and second spaces 25, 26. Further, the volumes and/or temperatures of the hot water flowing in the right and left heater cores may be independently controlled using respective valves.

In the above embodiment, the rotation-restricting portions 315a, 325a and the engaging holes 316a, 326a have the D-shaped cross-sections, respectively to engage with each other. However, the rotation-restricting structure for restricting relative rotation of the first and second rotation shafts 31a, 32a may be modified. For example, the rotation-restricting structure may be constructed by projections and grooves for receiving the projections or by press-fitting the projection of one door into the engaging hole of the other door.

In the above embodiment, the first and second rotation shafts 31a, 32a are directly operated by the actuators 310, 320. Alternatively, the first and second rotation shafts 31a, 32a may be operated through linking mechanisms.

In the above embodiment, since the first and second rotation shafts 31a, 32a are integrally formed with the door bodies, manufacturing costs reduce. However, the rotation shafts 31a, 32a may be formed separately from the door bodies and then integrated with the door bodies.

In the above embodiment, the first to fourth shaft receiving portions 211, 212, 271, 272 are integrally formed with the air conditioning case 21 and the separation wall 27. Thus, the first to fourth shaft receiving portions 211, 212, 271, 272 are manufactured with reduced costs. However, the first to fourth shaft receiving portions 211, 212, 271, 272 may be formed separately from the air conditioning case 21 and the separation wall 27.

Further, the above shaft end structures are employed to rotations shafts of doors other than the plate doors. For example, the above shaft end structure may be employed to shafts of rotary doors, film doors, butterfly doors, and the like.

Moreover, the use of the above shaft end structures is not limited to the doors of the vehicle air conditioning apparatus. The above shaft end structures may be employed to various air conditioning apparatuses. The air conditioning apparatus is not limited to the illustrated structure shown in FIGS. 1 and 2. Furthermore, the use of the above shaft end structure is not limited to the air passage opening and closing device that opens and closes air passages. The above shaft end structures may be employed to any fluid passage opening and closing device that opens and closes fluid passages through which any fluids such as liquid flow.

The example embodiments of the present invention are described above. However, the present invention is not limited to the above example embodiments, but may be implemented in other ways without departing from the spirit of the invention.

What is claimed is:

1. An air passage opening and closing device for a vehicle air conditioning apparatus, comprising:
   an air conditioning case defining a first air passage and a second air passage therein;
   a first door disposed to open and close the first air passage, the first door including a first rotation shaft and a first door body movable with the first rotation shaft, the first rotation shaft including a first end and a second end;
   a second door disposed to open and close the second air passage, the second door including a second rotation shaft and a second door body movable with the second rotation shaft, the second rotation shaft including a first end and a second end, the second door disposed such that the second rotation shaft is aligned with the first rotation shaft of the first door; and
   a shaft receiving part configured to rotatably support at least one of the first and second ends of the first and second rotation shafts, wherein
   the first ends of the first and second rotation shafts include projections projecting in an axial direction,
   the second ends of the first and second rotation shafts include cylindrical portions defining engaging holes therein, the engaging holes capable of engaging with the projections of the first and second rotation shafts,
   the shaft receiving part includes a first supporting portion defining a though hole that allows the projections of the first and second rotation shafts to pass through and a second supporting portion that is coaxially disposed relative to the first supporting portion and capable of engaging with the cylindrical portions of the first and second rotation shafts,
   the first and second doors are capable of being assembled in one of a first assembled condition and a second assembled condition,
   in the first assembled condition, the projections of the first and second rotation shafts are directed in opposite directions, the cylindrical portions of the first and second rotation shafts are rotatably engaged with the second supporting portion, and the first and second rotation shafts are rotatable independent from each other, and
   in the second assembled condition, the projection of the second rotation shaft is engaged with the engaging hole of the first rotation shaft, and the second rotation shaft is rotatable with the first rotation shaft.

2. The passage opening and closing device according to claim 1, wherein
   the first and second door bodies are integrally formed with the first and second rotation shafts, respectively.

3. The passage opening and closing device according to claim 1, wherein
   the shaft receiving part has a coaxial double cylindrical structure including an inner cylindrical portion and an outer cylindrical portion,
   the first supporting portion is provided by a radial inner surface of the inner cylindrical portion, and
   the second supporting portion is provided by a radial outer surface of the inner cylindrical portion and a radial inner surface of the outer cylindrical portion.

4. The passage opening and closing device according to claim 1, wherein
   the shaft receiving part is one of a middle shaft receiving part disposed at a position between the first and second air passages, and opposed shaft receiving parts disposed to oppose the middle shaft receiving part in the axial direction,
   in the first assembled condition, the cylindrical portions of the first and second rotation shafts are rotatably engaged with the second supporting portion of the middle shaft receiving portion, and the projections of the first and second rotation shafts rotatably pass through the first supporting portions of the opposed shaft receiving portions,
   in the second assembled condition, the cylindrical portion of the first rotation shaft is rotatably engaged with the second supporting portion of the middle shaft receiving part, the projection of the first rotation shaft rotatably passes through the first supporting portion of one of the opposed shaft receiving portion, the projection of the second rotation shaft rotatably passes through the first supporting portion of the middle shaft receiving portion, and the cylindrical portion of the second rotation shaft is rotatably engaged with the second supporting portion of the other one of the opposed shaft receiving portions.

5. The passage opening and closing device according to claim 4, further comprising:
   a separation wall separating the first and second passages inside of the air conditioning case,
   the middle shaft receiving part is integrated with the separation wall, and
   the opposed shaft receiving parts are integrated with the air conditioning case.

6. The passage opening and closing device according to claim 4, wherein
   the projections of the first and second rotation shafts are longer than the middle shaft receiving portion with respect to the axial direction.

7. The passage opening and closing device according to claim 1, wherein the projections of the first and second rotation shafts include non-circular portions having non-circular shaped cross-sections, and the engaging holes partly define non-circular portions having non-circular shaped cross-sections, the non-circular portions of the engaging holes are capable of engaging with the non-circular portions of the projections to restrict relative rotation of the first and second rotation shafts.

8. A passage opening and closing device comprising:
a case defining a first fluid passage and a second fluid passage therein;
a first door disposed to open and close the first fluid passage, the first door including a first rotation shaft and a first door body movable with the first rotation shaft, the first rotation shaft including a first end and a second end;
a second door disposed to open and close the second fluid passage, the second door including a second rotation shaft and a second door body movable with the second rotation shaft, the second rotation shaft including a first end and a second end, the second door disposed such that the second rotation shaft is aligned with the first rotation shaft of the first door; and
a shaft receiving part configured to rotatably support at least one of the first and second ends of the first and second rotation shafts, wherein
the first ends of the first and second rotation shafts include projections projecting in an axial direction,
the second ends of the first and second rotation shafts include cylindrical portions defining engaging holes therein, the engaging holes capable of engaging with the projections of the first and second rotation shafts,
the shaft receiving part includes a first supporting portion defining a though hole that allows the projections of the first and second rotation shafts to pass through and a second supporting portion that is coaxially disposed relative to the first supporting portion and capable of engaging with the cylindrical portions of the first and second rotation shafts,
the first and second doors are capable of being assembled in one of a first assembled condition and a second assembled condition,
in the first assembled condition, the projections of the first and second rotation shafts are directed in opposite directions, the cylindrical portions of the first and second rotation shafts are rotatably engaged with the second supporting portion, and the first and second rotation shafts are rotatable independent from each other, and
in the second assembled condition, the projection of the second rotation shaft is engaged with the engaging hole of the first rotation shaft, and the second rotation shaft is rotatable with the first rotation shaft.

9. The passage opening and closing device according to claim 8, wherein
the projections of the first and second rotation shafts include non-circular portions having non-circular shaped cross-sections, and
the engaging holes partly define non-circular portions having non-circular shaped cross-sections, the non-circular portions of the engaging holes are capable of engaging with the non-circular portions of the projections to restrict relative rotation of the first and second rotation shafts.

10. An opening and closing device for a vehicle air conditioning apparatus, comprising:

a case defining a first opening in communication with a first fluid passage and a second opening in communication with a second fluid passage;
a first door disposed to open and close the first opening, the first door including a first rotation shaft and a first door body integrated with the first rotation shaft, the first rotation shaft including a first end and a second end;
a second door disposed to open and close the second opening, the second door including a second rotation shaft and a second door body integrated with the second rotation shaft, the second rotation shaft including a first end and a second end, and the second door disposed such that the second rotation shaft is aligned with the first rotation shaft;
a middle shaft receiving portion integrated with the case at a position between the first and second openings for receiving the first and second ends of the first and second rotation shafts;
a first opposed shaft receiving portion integrated with the case at a position opposed to the middle shaft receiving portion in the first opening for receiving one of the first and second ends of the first rotation shaft; and
a second opposed shaft receiving portion integrated with the case at a position opposed to the middle shaft receiving portion in the second opening for receiving one of the first and second ends of the second rotation shaft, wherein
the first ends of the first and second rotation shafts include projections projecting in an axial direction,
the second ends of the first and second rotation shafts include cylindrical portions defining engaging holes that are capable of engaging with the projections,
the middle shaft receiving portion includes a first supporting portion that allows the projections to pass through and a second supporting portion that is disposed coaxially outside of the first supporting portion for rotatably receiving the cylindrical portions,
the first and second rotation shafts have an identical shape and are capable of being assembled in one of a first assembled condition where the first and second rotation shafts are rotatable independent from each other and a second assembled condition where the first and second rotation shafts are rotatable with each other,
in the first assembled condition, the projections of the first and second rotation shafts are rotatably received by the first and second opposed shaft receiving portions, respectively, and the cylindrical portions of the first and second rotation shafts are rotatably received by the second supporting portion of the middle shaft receiving portion, and
in the second assembled condition, the projection of the first rotation shaft is rotatably received by the first opposed shaft receiving portion, the cylindrical portion of the first rotation shaft is rotatably received by the second supporting portion of the middle shaft receiving portion, the projection of the second rotation shaft rotatably passes through the first supporting portion and is engaged with the engaging hole of the cylindrical portion of the first rotation shaft in a rotation-restricted manner relative to the first rotation shaft, and the cylindrical portion of the second rotation shaft is rotatably received by the second opposed shaft receiving portion.

* * * * *